TELECOMMUNICATION SYSTEM

Filed March 22, 1950

INVENTOR.
HENRI GARDERE
BY [signature]
agt

Patented Dec. 23, 1952 2,623,169

UNITED STATES PATENT OFFICE 2,623,169

TELECOMMUNICATION SYSTEM

Henri Gardere, Paris, France, assignor to Compagnie Industrielle Des Telephones, Paris, France, a corporation of France Application March 22, 1950, Serial No. 151,261
In France March 28, 1949

2 Claims. (Cl. 250—20)

Figure 1:
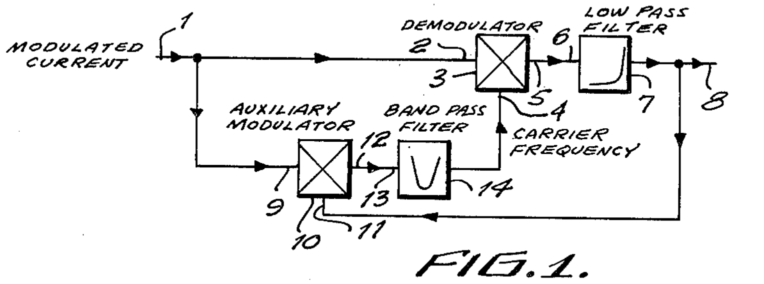

The present invention relates to telecommunication systems employing a high-frequency amplitude-modulated carrier current, with transmission of the two modulation side-bands and suppression of the carrier wave.

Its object is an improvement in a device for reconstituting the carrier wave, as also various methods of using this device.

It is well known that, in a non-transmitted carrier wave system, it is necessary to restore the carrier current, at the receiving station, with the exact frequency it had at the transmitting station.

French Patent No. 803,109, filed on 6th June, 1935, described a device making it possible to obtain this result in a simple manner. This device comprises an auxiliary modulator, fed on the one hand by the current received at the input of the receiving station, and on the other hand by the demodulated current collected at the output of the main demodulator; this auxiliary demodulator feeds the main demodulator through a band pass filter or a selective amplifier, of which the pass-band is centered on the carrier frequency.

However, a device of this kind may find itself at fault, when the signal to be transmitted comprises several frequencies, in the case in which the transmission is affected by selective fading or phase distortion. The modulated current received on the input of the receiving station, in fact, no longer has the form it had at the output of the transmitting station.

The present invention, which makes it possible to overcome this drawback, has as its object an improvement in the above-mentioned device, characterized in this, that the band-pass filter which is arranged on the output of the auxiliary modulator and by means of which the supply of carrier current of the main demodulator is effected, has a narrower pass-band than the deviation between the two frequencies nearest together among those which constitute the spectrum of the modulating current.

The invention also comprises receiving sets employing such a device for restoring the carrier current.

In the first of these assemblies, one and the same demodulator is used both for the demodulation properly so-called of the signals and for the restoration of the carrier current; the two modulation side bands are then totally demodulated.

In a second assembly, one demodulator is used for the demodulation, properly so-called, of the signals, and a separate modulator for the restoration of the carrier current which feeds the first demodulator; then one only of the two side-bands is demodulated. Finally, in a third arrangement, a separate demodulator is used for the demodulation of the signals of each of the two side-bands separated by filtering. The two demodulators are fed simultaneously by the device for restoring the carrier current.

Such sets are particularly applicable to systems ensuring the transmission, by hertzian waves, of the whole of the channels of a multiple harmonic telegraph system. The arrangement ensuring the separate demodulation of the two bands is particularly well suited to the carrying out of the so-called "diversity" receiving device.

Figure 2:
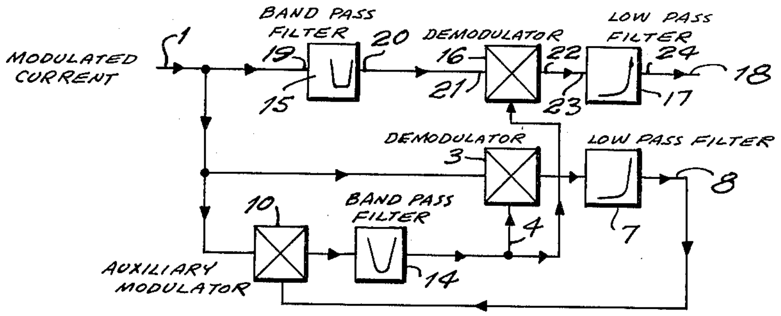

The attached drawings show schematically and by way of example the device according to the invention and its various methods of use:

Fig. 1 shows the arrangement of the device for restoring the carrier current;

Fig. 2 a set for the reception of a single side-band; and

Figure 3:
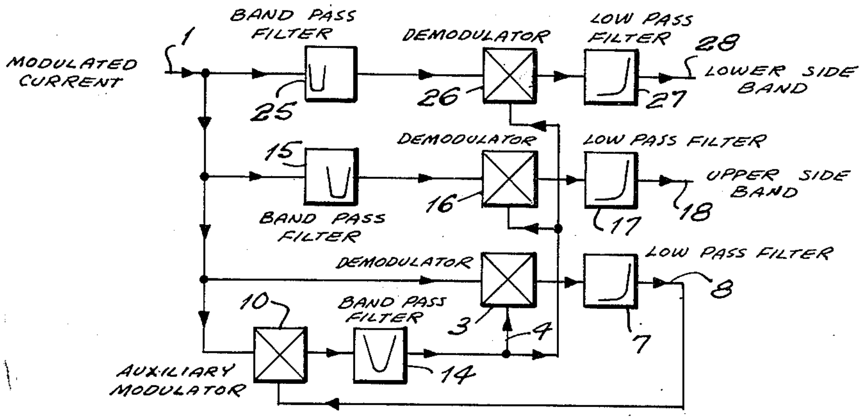

Fig. 3 a set for the separate reception of the two side-bands.

Fig. 1 shows the diagram of the device according to the above-mentioned French Patent 803,109. This device comprises the main demodulator (3) fed on the one hand by the modulated current received at 1 at the end of the transmission line, and on the other hand by the current at the carrier frequency, obtained by arranging a first band-pass filter 14 (if need be combined with an amplifier) centered on this frequency, on the output of an auxiliary modulator (10) itself fed, on the one hand, by the modulated current received at 1 and on the other hand by a fraction of the current on the output of the low-pass filter (7) (termed hereinafter the first low-pass filter) which follows the main demodulator.

The applicant has mathematically demonstrated and experimentally verified that, if the band-width of filter 14 is less than the deviation between the frequencies of the two components of the modulating current, of which the frequencies are closest together, the parasitic components introduced during transmission by the amplitude- and phase-distortion are eliminated, and the current collected on the output of this filter has the same shape as the carrier current used in the transmission.

A device of this kind for restoring the carrier wave may be used for the total demodulation of the two side-bands. The arrangement is then the same as that of Fig. 1, the demodulated signals being simply collected at the output 8 of the demodulator 3, which then serves both for the restoration of the carrier current and for the reception, properly so-called, of the signals.

This arrangement is the simplest and most effective when the transmission is carried out with a low level of atmospheric noises and little amplitude- or phase-distortion. If, however, there is a phase distortion between the components of the modulated current received at 1 and the carrier current restored at 4, certain components of the signals may be suppressed. On the other hand, not only the two-side-bands, but also the interval between these two bands, which is useless, are received at 2 in the demodulator, which helps to increase the atmospheric noises.

In order to overcome this drawback, another arrangement is used, shown schematically in Fig. 2, and comprising separate circuits for the demodulation, properly so-called, of the signals and for the restoration of the carrier current.

The system of restoration of the carrier current is the same as that shown in Fig. 1, and comprises the main demodulator 3, the first low-pass filter 7, the auxiliary modulator 10 and the device for filtering the carrier current 14. However, the demodulated and filtered current collected at 8 is only used to feed the auxiliary modulator 10.

The demodulation proper of the signals received is effected in a separate circuit comprising a band-pass filter 15, (termed hereinafter the second band-pass filter) which only passes one of the two side-bands of the modulated current received, a demodulator 16, (termed hereinafter the first demodulator) fed on the one hand by the current on the output of 15 and on the other hand by the restored carrier current collected at 4, and a low-pass filter 17, (termed hereinafter the second low pass filter) eliminating the high-frequency component of the demodulation. This low-pass filter is, moreover, optional. Owing to the single-band reception, the amplitudes of the components of the signals received are independent of the phase of the restored carrier current.

The invention also provides another embodiment of the receiving device, in which the two side-bands received are separated by filtering and demodulated separately (Fig. 3).

There are then two separate receiving circuits, one comprising a second band-pass filter 15 centred on the upper side band, a first demodulator 16 and a second low-pass filter 17, the other comprising a first band-pass filter 25 centred on the lower side-band, a second demodulator 26 and a third low-pass filter 27. The two demodulators 16 and 26 are fed with carrier current by the restoration device comprising the modulators 3 and 10. The signals corresponding to the two bands are respectively collected at 28 and 18.

With this arrangement two independent receiving channels are available for the same received signals. This arrangement makes it possible, in the case in which these signals comprise several frequencies, to employ the method known as the "diversity method," by separately detecting the signals received on the two receiving channels.

What we claim is:

1. A receiving arrangement for modulated signals, the frequencies of which form a discontinuous spectrum and the carrier frequency of which is suppressed, comprising in combination, a transmisssion line for receiving the modulated signals; a main demodulator having an input connected to said transmission line; a first low-pass filter having an input connected to the output of said main demodulator; an auxiliary modulator having an input connected to said transmission line, said auxiliary modulator being centered on the carrier frequency, the input of said auxiliary modulator being connected to the output of said first low-pass filter; a first band-pass filter connected between said auxiliary modulator and said main demodulator, and having a band width being less than the least deviation between the modulating frequencies; a second band-pass filter having an input connected to said transmission line and being tuned so as to pass one of the side bands of the signals received by said transmission line; a demodulator having an input connected to said second band-pass filter, said demodulator being connected to the output of said first band-pass filter so as to be fed thereby; and a second low-pass filter having an input connected to the output of said demodulator, said second low-pass filter eliminating the high-frequency components of the current delivered by said demodulator and having an output supplying the one side band to which said second band-pass filter is tuned, whereby parasitic current components introduced during transmission by amplitude and phase distortion are eliminated.

2. A receiving arrangement for modulated signals, the frequencies of which form a discontinuous spectrum and the carrier fraquency of which is suppressed, comprising in combination, a transmission line for receiving the modulated signals; a main demodulator having an input connected to said transmission line; a first low-pass filter having an input connected to the output of said main demodulator; an auxiliary modulator having an input connected to said transmission line, said auxiliary modulator being centered on the carrier frequency, the input of said auxiliary modulator being connected to the output of said first low-pass filter; a first band-pass filter connected between said auxiliary modulator and said main demodulator, and having a band width being less than the least deviation between the modulating frequencies; a second band-pass filter having an input connected to said transmission line and being tuned so as to pass one of the side bands of the signals received by said transmission line; a first demodulator having an input connected to said second band-pass filter, said first demodulator being connected to the output of said first band-pass filter so as to be fed thereby; a second low-pass filter having an input connected to the output of said first demodulator, said second low-pass filter eliminating the high-frequency components of the current delivered by said first demodulator and having an output supplying the one side band to which said second band-pass filter is tuned; a third band-pass filter having an input connected to said transmission line and being tuned so as to pass another of the side bands of the signals received by said transmission line; a second demodulator having an input connected to said third band-pass filter, said second demodulator being connected to the output of said first band-pass filter so as to be fed thereby; and a third low-pass filter having an input connected to the output of said second demodulator, said third low-pass filter eliminating the high-frequency component of the current delivered by said second demodulator and having an output supplying the other side band to which said third band-pass filter is tuned.

HENRI GARDERE.

REFERENCES CITED

The following references are of record in the file of this patent:

UNITED STATES PATENTS

| Number | Name | Date |
|---|---|---|
| 1,922,282 | Bellescize | Aug. 15, 1933 |
| 2,108,117 | Gardere et al. | Feb. 15, 1938 |
| 2,480,575 | Hare | Aug. 30, 1949 |